(12) United States Patent
Inoue et al.

(10) Patent No.: US 10,471,604 B2
(45) Date of Patent: Nov. 12, 2019

(54) FORCE DETECTION DEVICE AND ROBOT

(71) Applicant: FANUC CORPORATION, Minamitsuru-gun, Yamanashi (JP)

(72) Inventors: Youichi Inoue, Yamanashi (JP); Junya Fujita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/809,165

(22) Filed: Nov. 10, 2017

(65) Prior Publication Data

US 2018/0133902 A1 May 17, 2018

(30) Foreign Application Priority Data

Nov. 14, 2016 (JP) .................... 2016-221760

(51) Int. Cl.
  *B25J 13/08* (2006.01)
  *G01L 5/00* (2006.01)

(52) U.S. Cl.
  CPC .......... *B25J 13/085* (2013.01); *G01L 5/0061* (2013.01); *G05B 2219/40201* (2013.01); *G05B 2219/40202* (2013.01)

(58) Field of Classification Search
  CPC ........ B25J 13/085; G01L 1/22; G01L 1/2206; G01L 1/2218; G01L 3/108; G01L 5/0061; G05B 2219/39529; G05B 2219/40582; G05B 2219/40586; G05B 2219/40599
  See application file for complete search history.

(56) References Cited

U.S. PATENT DOCUMENTS

| | | | | |
|---|---|---|---|---|
| 4,448,083 A | * | 5/1984 | Hayashi | ................... G01L 5/161 73/862.042 |
| 4,763,531 A | * | 8/1988 | Dietrich | .................. G01L 5/161 73/862.044 |
| 5,063,788 A | | 11/1991 | Ch'Hayder et al. | |
| 5,263,375 A | | 11/1993 | Okada | |
| 5,490,427 A | | 2/1996 | Yee et al. | |
| 5,526,700 A | | 6/1996 | Akeel | |
| 7,437,954 B2 | | 10/2008 | Sakano | |
| 8,733,182 B2 | * | 5/2014 | Huizinga | ................ B60T 17/22 73/862.045 |
| 8,984,962 B2 | * | 3/2015 | Christmann | .............. G01L 3/10 73/862.041 |
| 9,946,248 B2 | | 4/2018 | Nakayama et al. | |
| 2004/0187593 A1 | | 9/2004 | Okada | |

(Continued)

FOREIGN PATENT DOCUMENTS

| | | |
|---|---|---|
| CN | 1396458 A | 2/2003 |
| CN | 1841032 A | 10/2006 |

(Continued)

*Primary Examiner* — Dale Moyer
(74) *Attorney, Agent, or Firm* — RatnerPrestia

(57) ABSTRACT

A force detection device with a structure able to improve the accuracy for force-detection. A force detection device with a deforming member to be deformed under an external force, the force detection device comprising a fixation part which is a part fixed to an attachment to which the force detection device is to be attached. The fixation part is provided at the deforming member such that the fixation part protrudes from a bottom surface of a bottom part of the deforming member opposite to the attachment.

6 Claims, 4 Drawing Sheets

(56) References Cited

U.S. PATENT DOCUMENTS

| | | | | |
|---|---|---|---|---|
| 2006/0213287 | A1* | 9/2006 | Sakano | G01L 5/161 73/862.042 |
| 2007/0205776 | A1* | 9/2007 | Harish | G01G 7/06 324/662 |
| 2012/0180575 | A1 | 7/2012 | Sakano et al. | |
| 2013/0126249 | A1* | 5/2013 | Buttolph | G01L 1/2218 177/211 |
| 2014/0262551 | A1* | 9/2014 | Santi | G01G 19/12 177/1 |
| 2015/0096387 | A1* | 4/2015 | Berme | G01L 1/2206 73/862.045 |
| 2015/0204742 | A1* | 7/2015 | Draisey | G01L 5/16 73/862.041 |
| 2015/0323398 | A1* | 11/2015 | Lauzier | B25J 9/0081 73/862.08 |
| 2015/0367510 | A1* | 12/2015 | Naitou | B25J 9/1633 700/253 |
| 2016/0114484 | A1* | 4/2016 | Nakayama | G05B 19/4062 700/253 |
| 2016/0131216 | A1* | 5/2016 | Miyazaki | F16F 1/14 73/862.321 |
| 2016/0245711 | A1* | 8/2016 | Berme | G01L 1/2206 |
| 2017/0136629 | A1* | 5/2017 | Nagata | B25J 13/085 |
| 2017/0205296 | A1* | 7/2017 | Bradford | G01L 1/22 |
| 2017/0211999 | A1* | 7/2017 | Bradford | B25J 13/085 |
| 2017/0266814 | A1* | 9/2017 | Uemura | B25J 13/085 |
| 2018/0024015 | A1* | 1/2018 | Berme | G01L 25/00 73/760 |
| 2018/0029238 | A1* | 2/2018 | Basit | B25J 13/085 |
| 2018/0099421 | A1* | 4/2018 | Ogata | B25J 13/085 |
| 2018/0215047 | A1* | 8/2018 | Sato | G01L 3/1435 |

FOREIGN PATENT DOCUMENTS

| | | |
|---|---|---|
| CN | 105538308 A | 5/2016 |
| DE | 102012100111 A1 | 8/2012 |
| DE | 102015200514 B3 | 6/2016 |
| JP | 2602590 Y2 | 1/2000 |
| JP | 2009-074969 A | 4/2009 |
| JP | 5117804 B2 | 1/2013 |

* cited by examiner

FORCE DETECTION DEVICE AND ROBOT

CROSS-REFERENCE TO RELATED APPLICATIONS

This application is a new U.S. Patent Application that claims benefit of JP 2016-221760, filed Nov. 14, 2016, the disclosure of this application is being incorporated herein by reference in its entirety for all purposes.

BACKGROUND OF THE INVENTION

1. Field of the Invention

The invention relates to a force detection device that detects an external force acting on a structure, and to an industrial robot having a structure to which the force detection device is attached.

2. Description of the Related Art

In recent years, industrial robots, in place of safety fences, that properly ensure the safety of humans by taking certain measures have become capable of working in cooperation with humans. This has led to increased demand for such robots, dubbed "collaborative robots".

When a collaborative robot is used, a human and the robot share the same workspace, and it is therefore necessary to prevent the human from being injured coming into contact with the robot. Accordingly, a method is employed in which a force detection device (called a "force sensor" hereinafter) is attached to the robot main body and monitors a contact force between the human and the robot. For example, when a contact force exceeding a predetermined threshold value is detected by the force sensor, the operation of the robot is stopped or the robot is caused to operate in a manner that mitigates the contact force.

A force sensor such as that mentioned above typically includes a force sensor body that deforms under an external force as a deforming member, and a strain detector fixed to the force sensor body. The force sensor body is attached to the structure, and a deformation amount in the force sensor body is detected by the strain detector. The magnitude, direction, and the like of the force acting on the structure can be ascertained on the basis of the detected value. As an example of such a force sensor, JP-A-2009-74969 proposes a six-axis force sensor having a simple structure.

In force sensors, what is known as calibration, in which correction parameters for converting an output signal from the strain detector constituting the force sensor into a force value are calculated, is typically carried out for the force sensor alone. Thus, when the force sensor is actually attached to the structure, if the force sensor itself deforms due to deformation or surface unevenness in the area of the structure to which the force sensor is attached (called an "attachment" hereinafter), variations will arise in the above-described correction parameters. This results in a problem that error in the force value detected by the force sensor will increase.

Particularly, in collaborative robots, when the contact force detected by the force sensor exceeds the predetermined threshold value, the operation of the robot is stopped or the robot is caused to operate in a manner that mitigates the contact force. Thus, if there is an increased amount of error in the detected value from the force sensor as described above, it is necessary to set the aforementioned threshold value higher, or in other words, to set the sensitivity to contact lower, in order to avoid erroneous detection of contact. When a human and a robot come into contact, there is a limit to the contact force that the human can take, and if the sensitivity with respect to contact is low, there will be increased limitations on how the collaborative robot can be used.

Thus, in the related art, the force sensor is attached to the attachment after first eliminating deformation, surface unevenness, and the like in the attachment in order to increase the detection precision of the aforementioned force sensor. Furthermore, the force sensor is attached to the attachment over a separate highly-rigid component in order to prevent the force sensor itself from deforming due to deformation, surface unevenness, and the like in the attachment when attaching the force sensor.

However, using a method that eliminates deformation in the attachment in advance, such as polishing the entire surface of the attachment in advance, increases the manufacturing cost of the attachment.

On the other hand, with the attachment method using a separate highly-rigid component, the separate highly-rigid component is a comparatively large and heavy component, and is thus limited to an installation environment capable of withstanding heavy objects. Additionally, the separate highly-rigid component interferes with the operating region of the robot, making it necessary to limit the operating region of the robot. There is thus a problem in that this method can only be used in limited situations. In particular, there are cases where the robot is installed and used in locations aside from a floor, such as a wall or a ceiling. If the robot is heavy, the wall or ceiling where the robot is installed also needs to be reinforced, which increases the cost of preparing the installation environment. A collaborative robot can be used without a safety fence, providing an advantage in that robots can be added to or removed from production lines more easily than robots in the related art. If the robot is heavy, however, the robot cannot be moved easily, detracting from the advantage the collaborative robot provides. A separate highly-rigid component may be connected to a force sensor and provided to a user, but this increases the size and weight, which reduces the usability from the standpoint of size and makes transport difficult.

Note that, JP-A-2009-74969 has no mention whatsoever of a force sensor structure capable of ensuring that a force sensor body does not deform due to deformation, surface unevenness, and the like in an attachment when attaching the force sensor.

Having been achieved in light of the above-described problems, an object of the invention is to provide a force detection device having a structure that improves the accuracy at which a force is detected, and a robot including the force detection device.

SUMMARY OF THE INVENTION

According to a first aspect of the invention, a force detection device with a deforming member to be deformed under an external force, comprises a fixation part which is a part fixed to an attachment to which the force detection device is to be attached, wherein the fixation part is provided at the deforming member such that the fixation part protrudes further than a bottom surface of a bottom part of the deforming member opposite to the attachment.

According to a second aspect of the invention, in the force detection device of the above-described first aspect, at least three of the fixation parts are provided at the deforming member.

According to a third aspect of the invention, in the force detection device of the above-described first aspect or second aspect, the force detection device includes a thinned part located between the base of the deforming member and the fixation part, the thinned part being thinner than each of the base and the fixation part.

According to a fourth aspect of the invention, in the force detection device of any one of the above-described first aspect to third aspect, a surface of a part of the fixation part, which contacts the attachment, is present only around a bolt attachment through-hole.

According to a fifth aspect of the invention, a robot includes the force detection device of any one of the above-described first aspect to fourth aspect, the robot being configured to detect an external force acting on the robot by the force detection device.

According to the invention, when the force detection device is fixed to the attachment such as a floor surface using the fixation part, the base of the deforming member that is the part aside from the fixation part does not make contact with the attachment, and thus the deforming member can be prevented from deforming due to deformation, surface unevenness, or the like in the attachment. Accordingly, differences in the shape of the deforming member between the deforming member in the force detection device alone, calibrated before the force detection device is attached, and shape of the deforming member in the force detection device after the force detection device is attached to the attachment, can be reduced. This increases the force detection accuracy.

Furthermore, in the case where the force detection device is attached to a robot, an external force acting on the robot can be detected more accurately. For example, in a collaborative robot working collaboratively with a human, contact between the human and the robot can be detected with a higher level of sensitivity, and thus the robot can be used more flexibly.

Furthermore, it is not necessary to eliminate deformation in the attachment in advance or provide a separate highly-rigid component. Thus, the manufacturing cost of the attachment can be suppressed, and the force detection device or the robot to which the force detection device is attached can be made smaller and lighter.

The objects, features and advantages as described above, and another objects and advantages of the invention of will become more apparent from the following description of the embodiments in connection with the accompanying drawings.

BRIEF DESCRIPTION OF THE DRAWINGS

The above-mentioned or other objects, features and advantages of the invention will become more apparent from the following description of embodiments in connection with the accompanying drawings, in which.

DETAILED DESCRIPTION

Figure 1:
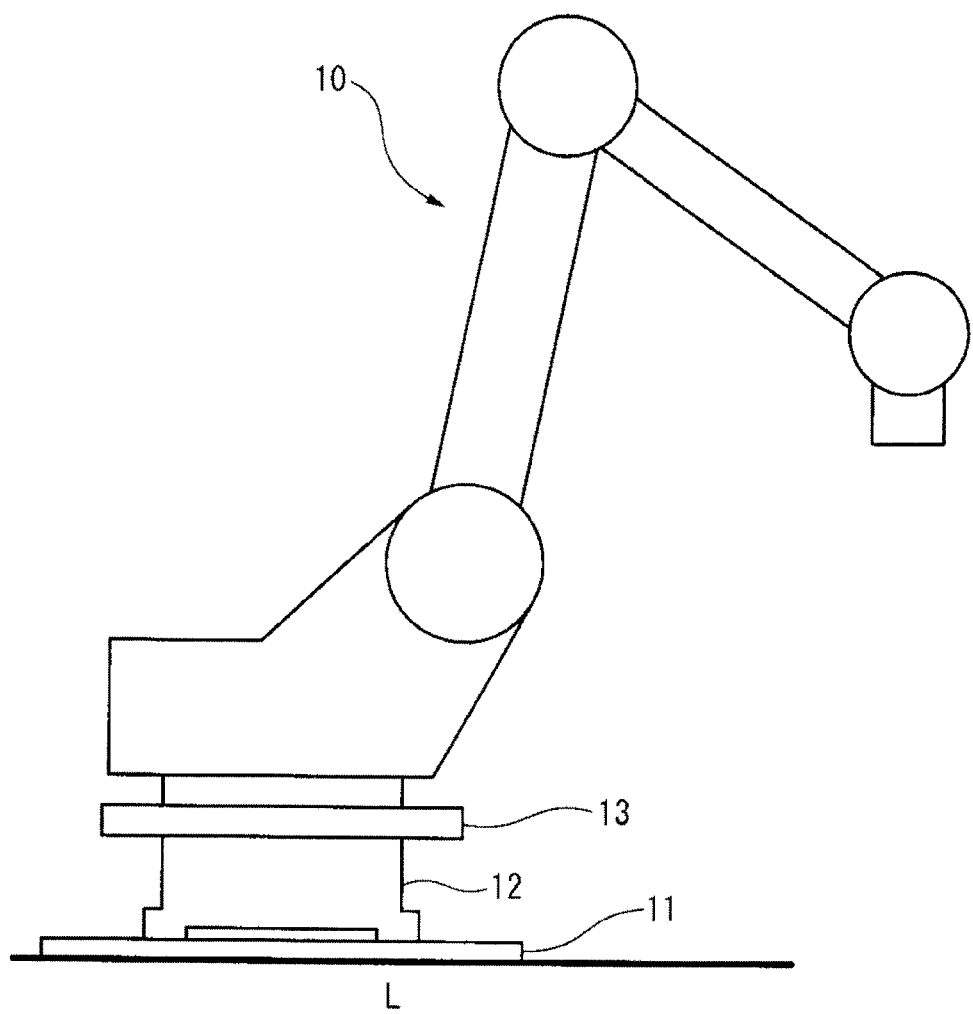
FIG. 1 is a schematic side view of an example of an industrial robot including a force detection device according to the invention.

Next, embodiments of the invention will be described with reference to the drawings. In the referenced drawings, similar structural or functional elements are assigned the same reference numerals. Scales in the drawings are appropriately changed, for the sake of easy understanding. Further, the embodiment illustrated in the drawings is merely one example embodying the invention, and the invention should not be limited to the illustrated embodiment.

FIG. 1 is a side view schematically illustrating an example of an industrial robot including a force detection device (hereinafter, referred to as "force sensor") according to the invention.

A robot 10 illustrated in FIG. 1 is an industrial robot constituted by e.g. a vertical articulated manipulator, and is a collaborative robot (hereinafter, referred to as simply "robot") that shares a work area with a human and cooperates with a human there. In order to install the robot 10 on a floor L, a fixation plate 11 is fixed on the floor L. A force sensor 12 is fixed on the fixation plate 11, and a robot base 13 that is a lower part of the robot 10 is fixed on the force sensor 12.

The force sensor 12 is a device configured to detect an external force acting on the robot 10, such as a force by a human contacting the robot 10 (so-called, a "contact force"). The force sensor 12 is provided with a strain detector (e.g., an electrical resistance strain gauge) configured to detect deformation in a force sensor body due to the external force. The force sensor 12 is configured to calculate the force value applied to the force sensor body on the basis of an output signal from the strain detector.

Although the force sensor 12 is attached between the fixation plate 11 and the robot 10 in this embodiment, the force sensor 12 may be attached inside of the robot 10. Depending on the applications, force sensors 12 may be attached at multiple locations, between the fixation plate 11 and the robot 10, within the robot 10, and the like.

The force sensor 12 may be attached to a structure other than the robot 10. In other words, the force sensor 12 is not limited to being used in an industrial robot. Additionally, the strain detector that detects deformation in the force sensor body due to the external force is not limited to a strain gauge. An electrostatic capacitance sensor, a piezoelectric sensor, a displacement sensor, or the like can also be used.

Figure 2:
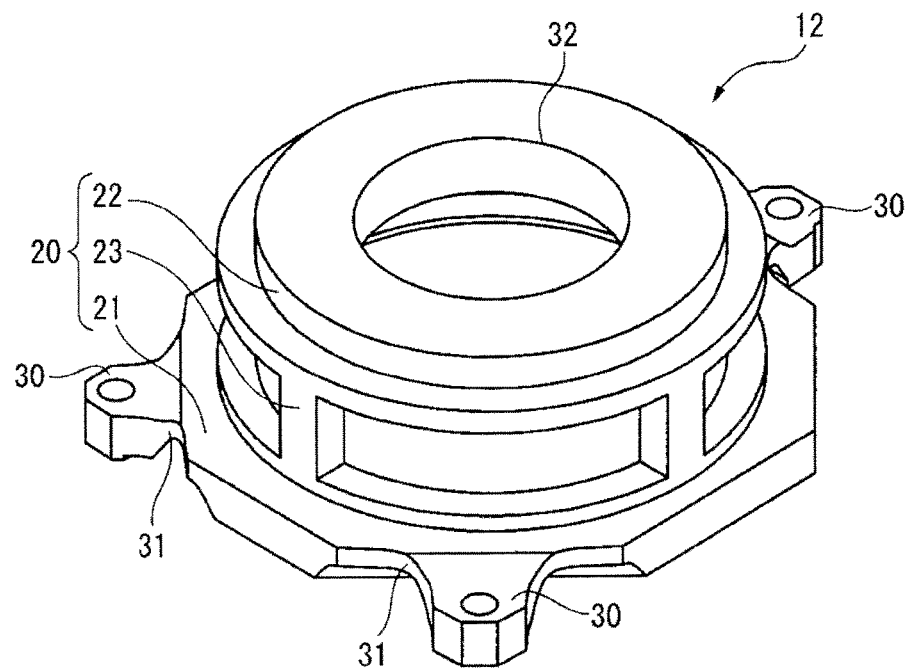
FIG. 2 is a perspective view of an embodiment of the force detection device according to the invention as seen from upper side thereof.
Figure 3:
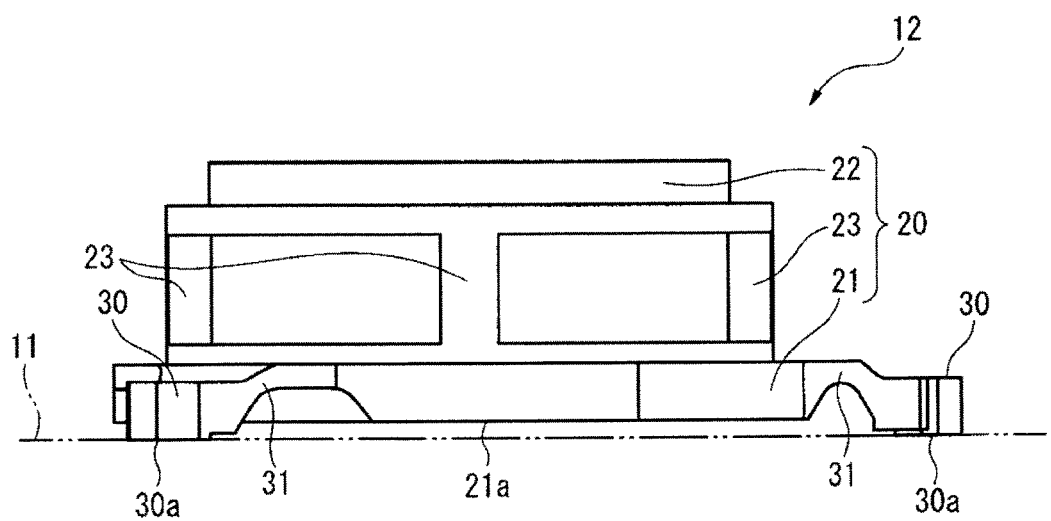
FIG. 3 is a front view of the force detection device according to an embodiment.

Next, the structure of the force sensor 12 that can be used in the above-described robot 10 will be specifically described. FIG. 2 is a perspective view of the single force sensor 12 as seen from upper side thereof, FIG. 3 is a front view of the single force sensor 12, FIG. 4 is a top view of the single force sensor 12, and FIG. 5 is a bottom view of the single force sensor 12.

The force sensor 12 according to this embodiment includes a cylindrical force sensor body 20 which is a deforming member to be deformed under an external force, and a plurality of strain detectors (not illustrated) fixed to the force sensor body 20. Note that, the external force detected by the force sensor 12 includes torque, moment, or the like.

As illustrated in FIGS. 2 to 5, the force sensor body 20 includes a plate-shaped bottom part 21, a ring-shaped top part 22 opposite to the bottom part 21, and columns 23 arranged between the bottom part 21 and the top part 22 so as to connect the bottom part 21 and the top part 22 to each other.

Figure 4:
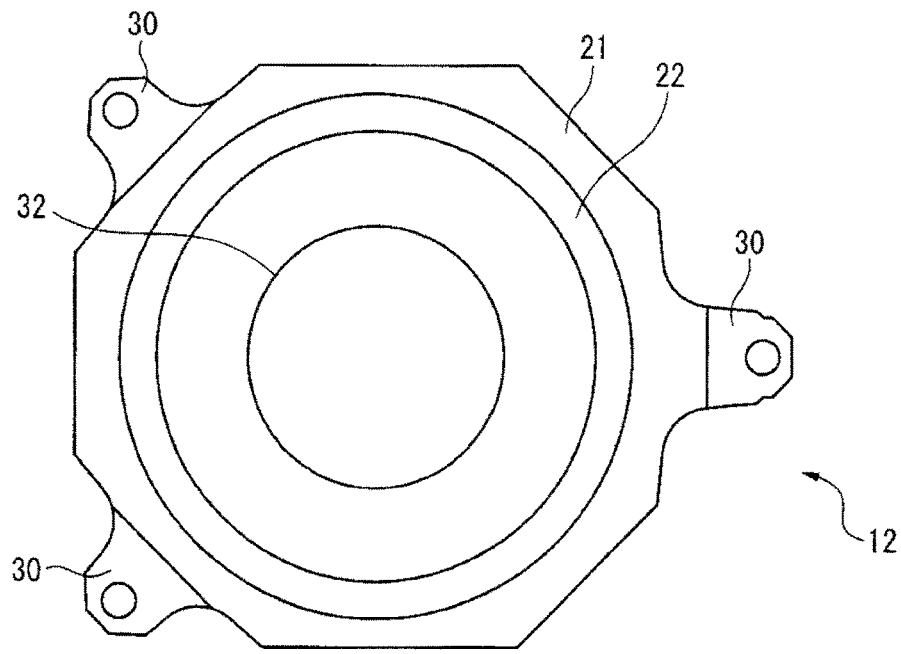
FIG. 4 is a top view of the force detection device according to an embodiment.
Figure 5:
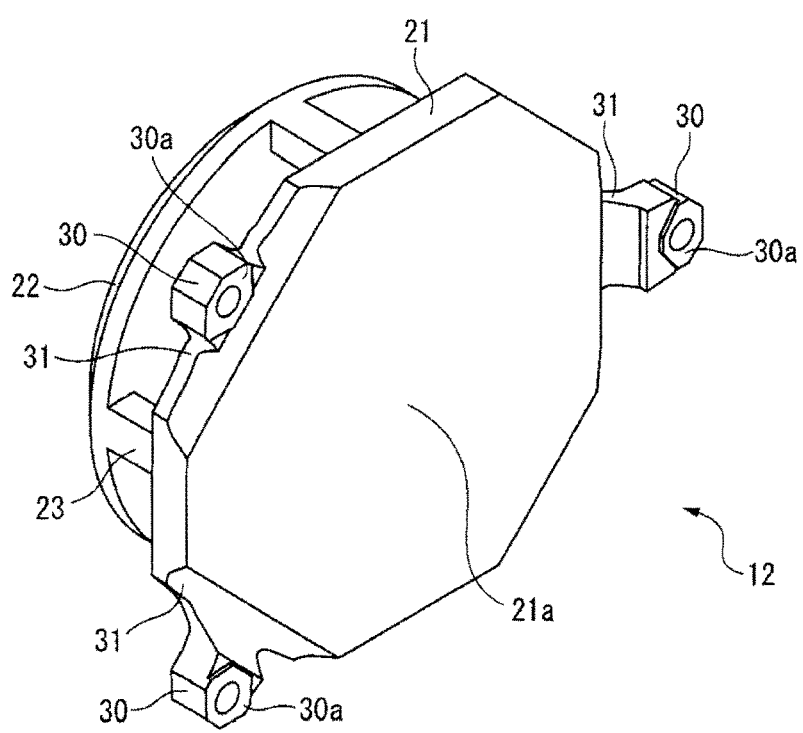
FIG. 5 is a bottom view of the force detection device according to an embodiment.

As can be seen from e.g. FIGS. 2 and 4, a total of four columns 23 are provided in this embodiment, however, the invention is not limited to this number of the columns 23.

Each column 23 is deformed when the above-described force sensor body 20 receives an external force and the bottom part 21 and the top part 22 is moved relative to each other. Accordingly, a strain detector (not illustrated) is fixed to each column 23.

If the force sensor 12 according to this embodiment is used in the robot 10 (see FIG. 1), the bottom part 21 which is a bottom of the force sensor 12 is fixed to the fixation plate 11 on the floor surface L, and the top part 22 which is a top of the force sensor 12 is attached to the robot base 13.

In the above-described force sensor 12, the columns 23 are deformed under an external force, thereby the output signals from the strain detectors change. By converting the output signals from the strain detectors into a force value, the magnitude and direction of the force acting on the force sensor body 20 can be detected.

Furthermore, in the above-described force sensor 12, it is necessary to carry out a calibration to calculate a calibration parameter for converting the output signals from the strain detectors into a force value. Since the calibration is very difficult to be carried out after the force sensor 12 has been attached to the robot 10, the calibration is carried out for the single force sensor 12 before the attachment. However, if the force sensor 12 is attached to a portion (i.e., an attachment) where the force sensor 12 is to the attached when the attachment is deformed, the force sensor body 20 is deformed due to the deformation, surface unevenness or the like generated in the attachment. As a result, the shape of the force sensor body 20 is changed from the shape when the calibration has been carried out, and therefore, the accuracy of the force detection by the force sensor 12 degrades. If a method of eliminating the deformation in the attachment before the force sensor 12 is attached is employed in order to solve the above-mentioned problem the manufacturing cost increases. On the other hand, if a method of attaching the force sensor 12 to the attachment via another member having high rigidity is employed, the above-mentioned problem occurs.

As illustrated in FIGS. 2 to 5, the force sensor 12 according to this embodiment includes fixation parts 30 fixed to the attachment where the force sensor 12 is to be attached by bolts or the like. Each fixation part 30 is formed integrally with the force sensor body 20 so as to protrude outward from a base surface 21a of the bottom part 21 of the force sensor body 20, wherein the base surface 21a is to be arranged to face the attachment such as the fixation plate 11.

For example, the above-described attachment is the fixation plate 11 on the floor surface L illustrated in FIG. 1.

By forming the fixation parts 30 in this way, the bottom part 21 of the force sensor body 20, which is a part of the force sensor body 20 other than the fixation parts 30, does not contact the fixation plate 11 when the force sensor 12 is fixed to the fixation plate 11 on the floor surface L (see FIG. 3 in particular).

Due to this, it is possible to prevent the force sensor body 20 from being deformed due to the deformation in the floor surface L or the fixation plate 11 when the force sensor 12 is attached.

Further, since it is possible to reduce the difference (change) in the shape between the force sensor body 20 of the single force sensor 12 at the time when the calibration therefor is carried out before the force sensor 12 is attached, and the force sensor body 20 of the force sensor 12 after the force sensor 12 is attached to the attachment, the force detection accuracy can be improved.

Note that, as the contact area between the attachment, such as the floor surface L, and the force sensor body 20 gets smaller, the deformation in the force sensor body 20 due to the deformation or surface unevenness in the attachment when attaching the force sensor 12 can be more-effectively prevented. Accordingly, it is optimal to set the number of fixation parts 30 to be minimal (i.e., three) to the extent that the force sensor 12 can be stably attached. However, if the external force is great and the strength of the force sensor 12 is insufficient, the number of fixation parts 30 can be increased to four or more while achieving the same effects.

As illustrated in FIGS. 3 and 5, it is preferable that the surface area of a part 30a of each fixation part 30 that contacts the attachment is set as small as possible by a method such as chamfering or fluting. For example, as can be seen from FIG. 5, the surface of the part 30a of each fixation part 30 in this embodiment, that contacts the attachment, is present only around a bolt attachment through-hole.

Furthermore, as can be seen from FIGS. 2 and 3, it is preferable that a thinned part 31 located between the bottom part 21 of the force sensor body 20 and each of the fixation parts 30, wherein the thinned part 31 is thinner than each of the bottom part 21 and the fixation parts 30. Due to this, the thinned parts 31 are less rigid and therefore are deformed more easily than both the bottom part 21 and the fixation parts 30. Since the thinned parts 31 is deformed when the fixation parts 30 of the force sensor 12 are fastened to the attachment by bolts or the like, it is possible to absorb the deformation or surface unevenness in the attachment by the thinned parts 31. As a result, it is possible to prevent the force sensor body 20 from being deformed due to the deformation in the attachment when the force sensor 12 is attached.

Further, in order that the deformation in the attachment may be absorbed by the thinned parts 31 as described above, it is preferable that the rigidity of the part other than the thinned parts 31 is enhanced. Accordingly, in this embodiment, an opening 32 for attaching a component constituting the force sensor 12, e.g., a processing circuit for the output signals from the strain detector, to the interior of the force sensor body 20 is formed only at the top part 22 of the force sensor body 20, as illustrated in FIGS. 2 and 4. In other words, such opening 32 is not formed at the bottom part 21 of the force sensor body 20, and rather is formed at a part other than the bottom part 21. Due to this, the rigidity of the bottom part 21, which is a part other than the thinned parts 31, can be enhanced.

Figure 6:
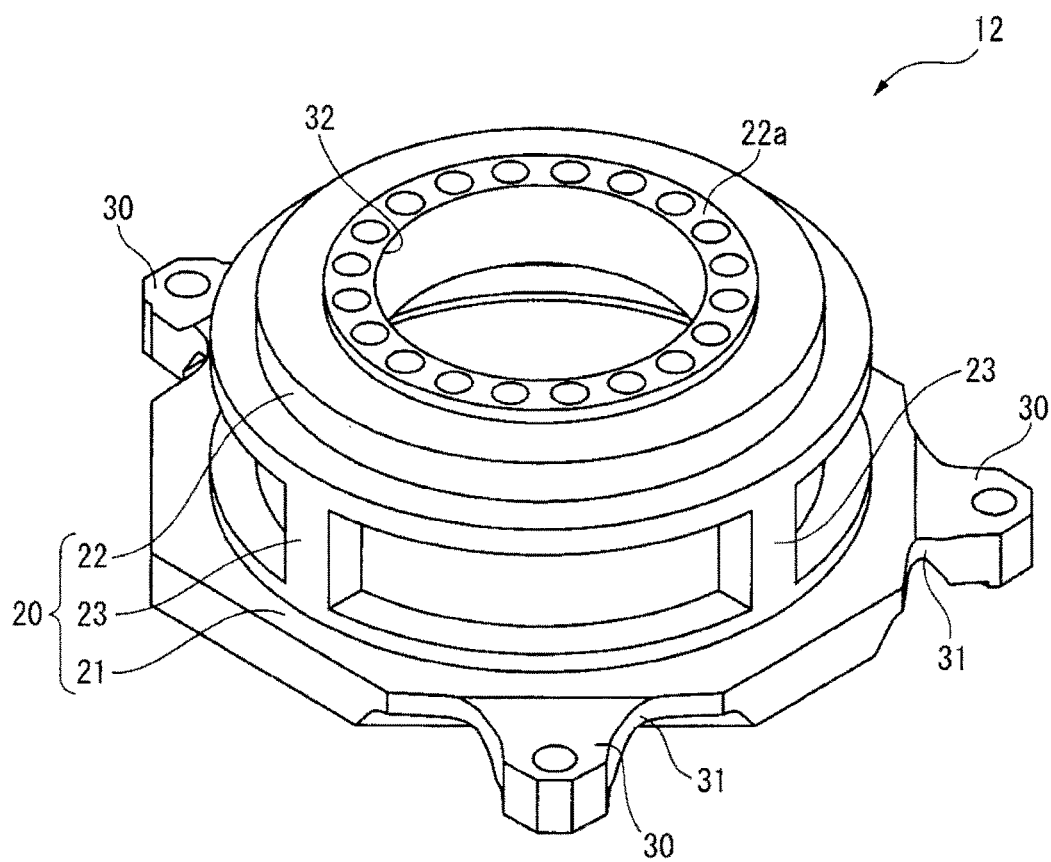
FIG. 6 is a perspective view illustrating the structure of a force detection device according to another embodiment.

As illustrated in FIG. 6, an attachment surface 22a for attaching a structure such as the robot base 13 (see FIG. 1) is provided at a top face of the top part 22 of the force sensor body 20 so as to project outward from the top part 22. By forming the attachment surface 22a in this manner, a portion of the top part 22 of the force sensor body 20 other than the attachment surface 22a does not contact the robot base 13 when attaching the robot base 13 to the top part 22 of the force sensor 12. Due to this, it is possible to prevent the force sensor body 20 from being deformed due to the deformation in a structure such as the robot base 13 when the structure is attached.

In the example illustrated in FIG. 6, although the attachment surface 22a is formed to be a ring shape so as to correspond to the shape of the ring-shaped top part 22, the shape of the attachment surface 22a is not limited to such a ring shape. The attachment surface 22a may have any shape as long as the contact area between the top part 22 of the force sensor body 20 and the structure attached to the top part 22 is smaller. For example, a width of the attachment surface 22a may be set as small as possible, or a corner of the attachment surface 22a may be chamfered. Additionally, the side attached to the fixation plate 11 may have a shape similar to the top part 22, or the side attached to the robot base 13 may have the fixation parts 30.

If the force sensor 12 according to the embodiments described above is attached to the robot 10, an external force acting on the robot 10 can be detected more accurately. For example, in a collaborative robot working collaboratively with a human, the contact between the human and the robot can be detected with a high sensitivity, and thus the collaborative robot can be used more flexibly.

However, beyond this embodiment, deformation in the force sensor body itself due to deformation, surface unevenness, and the like in the attachment worsens the force detection accuracy in any force sensor operating on a principle of calculating a force by detecting deformation in the force sensor body 20. Thus, the invention can be said to be useful in all force sensors operating on such a principle.

Although the foregoing has described the invention using a representative embodiment, it will be clear to one skilled in the art that many variations on the embodiment, as well as other modifications, omissions, and additions, can be made without departing from the scope of the invention.

The invention claimed is:

1. A force detection device comprising:
 a deforming member to be deformed under an external force, the deforming member including:
  a bottom part;
  a top part arranged opposite to the bottom part so as to be separate from the bottom part; and
  a column extending between the bottom part and the top part; and
 a first fixation part which is provided so as to protrude from the bottom part and which is a part fixed to a first attachment to which the force detection device is to be attached,
 wherein the first fixation part includes a contact surface which contacts the first attachment,
 wherein the contact surface is separated from a base surface of the bottom part in a direction away from the top part, and is laterally separated from a side surface of the bottom part, and
 wherein the force detection device is attached, at the top part side, to a second attachment to which the force detection device is to be attached.

2. The force detection device of claim 1, wherein at least three of the first fixation parts are provided at the deforming member.

3. The force detection device of claim 1, further comprising a thinned part located between the bottom part and the first fixation part, the thinned part being thinner than each of the bottom part and the first fixation part.

4. The force detection device of claim 1, wherein a surface of a part of the first fixation part, which contacts the first attachment, is present only around a bolt attachment through-hole.

5. A robot comprising a force detection device, the force detection device comprising:
 a deforming member to be deformed under an external force, the deforming member including:
  a bottom part;
  a top part arranged opposite to the bottom part so as to be separate from the bottom part; and
  a column extending between the bottom part and the top part; and
 a first fixation part which is provided so as to protrude from the bottom part and which is a part fixed to a first attachment to which the force detection device is to be attached,
 wherein the first fixation part includes a contact surface which contacts the first attachment,
 wherein the contact surface is separated from a base surface of the bottom part in a direction away from the top part, and is laterally separated from a side surface of the bottom part
 wherein the force detection device is attached, at the top part side, to a second attachment to which the force detection device is to be attached, and
 wherein the robot is configured to detect an external force acting on the robot by the force detection device.

6. The force detection device of claim 1, further comprising a second fixation part which is provided so as to protrude from the top part in a direction away from the bottom part and which is a part fixed to the second attachment.

* * * * *